United States Patent
Liu et al.

(10) Patent No.: US 7,023,430 B2
(45) Date of Patent: Apr. 4, 2006

(54) STYLUS RETAINING AND RELEASING MECHANISM FOR STYLUS-RECEIVING HOUSING

(75) Inventors: Ta-Wei Liu, Tao Yuan (TW); Duan-Ying Lin, Tao Yuan (TW)

(73) Assignee: High Tech Computer, Corp., Tao Yuan (TW)

( * ) Notice: Subject to any disclaimer, the term of this patent is extended or adjusted under 35 U.S.C. 154(b) by 282 days.

(21) Appl. No.: 10/064,797

(22) Filed: Aug. 19, 2002

(65) Prior Publication Data

US 2003/0067452 A1   Apr. 10, 2003

(30) Foreign Application Priority Data

Oct. 5, 2001   (TW) ............................ 90217006 U

(51) Int. Cl.
*G09G 5/00* (2006.01)
*G08C 21/00* (2006.01)

(52) U.S. Cl. .................. 345/179; 345/184; 178/19.01; 178/19.03; 178/19.04

(58) Field of Classification Search ........ 345/156–180, 345/183; 235/380; 335/205; 361/680, 683; 402/4; 178/18–20; 346/145
See application file for complete search history.

(56) References Cited

U.S. PATENT DOCUMENTS

| | | | | |
|---|---|---|---|---|
| 4,214,250 A * | 7/1980 | Fujita et al. | ................. | 346/145 |
| 4,507,770 A * | 3/1985 | Tanaka | ................... | 369/77.21 |
| 5,180,891 A * | 1/1993 | Trumbo | ................... | 178/19.01 |
| 5,500,191 A * | 3/1996 | DeMatte | ...................... | 427/358 |
| 5,561,282 A * | 10/1996 | Price et al. | ................. | 235/380 |
| 5,615,486 A * | 4/1997 | Igarashi et al. | ............... | 33/200 |
| 5,889,512 A * | 3/1999 | Moller et al. | ............... | 345/179 |
| 6,016,248 A * | 1/2000 | Anzai et al. | ................ | 361/683 |
| 6,149,506 A * | 11/2000 | Duescher | ..................... | 451/59 |
| 6,193,152 B1* | 2/2001 | Fernando et al. | ............ | 235/380 |
| 6,200,056 B1* | 3/2001 | Jordin et al. | ................... | 402/4 |
| 6,410,865 B1* | 6/2002 | Liu et al. | ................. | 178/19.01 |
| 6,545,577 B1* | 4/2003 | Yap | ............................. | 335/205 |
| 6,700,773 B1* | 3/2004 | Adriaansen et al. | ........ | 361/683 |
| 2002/0021291 A1* | 2/2002 | Cook | .......................... | 345/183 |
| 2002/0060098 A1* | 5/2002 | Liu et al. | ................. | 178/19.01 |
| 2002/0140684 A1* | 10/2002 | Lin et al. | ..................... | 345/179 |
| 2002/0190823 A1* | 12/2002 | Yap | ............................. | 335/205 |
| 2005/0018015 A1* | 1/2005 | Silverbrook | ................. | 347/54 |

\* cited by examiner

*Primary Examiner*—Vijay Shankar
*Assistant Examiner*—Prabodh Dharia
(74) *Attorney, Agent, or Firm*—Jiang Chyun IP Office

(57) ABSTRACT

An electronic device has a cavity in which a stylus can be slidably inserted. The stylus has a retaining slot thereon. Being inserted in the cavity, the stylus firstly pushes a retainer to be moved resiliently. The stylus further presses on a stylus-releasing device that terminates the cavity, thereby engaging the stylus-releasing device in a stable configuration with a resilient force. Meanwhile the retainer inserts into the retaining slot of the stylus to hold and immobilize the stylus in the cavity. To extract the stylus, a short pressing action is exerted on the stylus, which disengages the stylus-releasing device from the stable configuration, thereby the stylus-releasing device exerts a resilient force on the stylus that is ejected partially out of the cavity to facilitate a grasp of the stylus.

8 Claims, 4 Drawing Sheets

STYLUS RETAINING AND RELEASING MECHANISM FOR STYLUS-RECEIVING HOUSING

CROSS REFERENCE TO RELATED APPLICATIONS

This application claims the priority benefit of Taiwan application serial no. 90217006, filed on May 10, 2001.

BACKGROUND OF INVENTION

1. Field of the Invention

The invention relates generally to electronic equipment having a housing that can receive a stylus as pointing device and, more particularly, the invention relates to a stylus retaining and releasing mechanism for such a stylus-receiving housing.

2. Description of the Related Art

Information appliances presently constitute an important market for electronic industries. "Information appliances" broadly designate electronic products that can communicate via, for example, internet network. Information appliances should be therefore able to connect to internet, allow telephonic communication, receive and send out data, etc., while further being easily transportable. Information appliances that are presently commercialized include various types of devices such as mobile phones, Personal Digital Assistants (PDA), Web PAD.

Among those various types of devices, PDA devices are a representative example of information appliance development trend. PDA devices are hand-held electronic devices that can typically accomplish telecommunication operations of conventional mobile phone and multi-task operations of electronic organizer.

FIG. 1 is a perspective view that shows a conventional PDA device. From an external aspect, a conventional PDA device 100 typically comprises a housing 200 and a display screen 400. For convenience consideration, the PDA device 100 further may be provided with a separate stylus 300 as pointing device, in which case the display screen 400 is a touch panel display screen.

To conveniently dispose the stylus 300, the housing 200 of the PAD device 100 is conventionally provided with a cavity 210 therein to receive the stylus 300. The arrangement of the stylus 300 in the housing 200 should ensure a hold of the stylus 300 in the housing 200 and, meanwhile, allow a user to easily extract the stylus 300 from the housing 200.

Various mechanisms are conventionally used to hold and immobilize the stylus 300 once it is inserted in the cavity 210. One mechanism consists of, for example, adjusting the size of the cavity 210 and the size of the stylus 300 so that a tight contact there between, occurring when the stylus 300 is inserted in the cavity 210, ensures the hold of the stylus 300. To ensure a tight hold, an additional resilient element (not shown) may be conventionally added in the cavity 210 to press on the stylus 300. The above methods have the inconvenience of damaging the external surface of the stylus 300.

Another method consists of arranging a resilient retaining device (not shown) in the housing 200. When the stylus 300 is slidably inserted in the cavity 210, the resilient retaining device can resiliently insert in a retaining slot 310 formed on the stylus 300 to hold and immobilize the stylus 300 in the cavity 210. The resilience of the resilient retaining device is such that its hold can be easily overcome when the user pulls out the stylus 300. However, with the stylus 300 substantially enclosed in the cavity 210 while only a slight portion thereof protrudes out of the housing 200, it may be difficult for the user to grasp and extract the stylus 300.

To cure the above deficiency, some housing may be provided with an additional spring in the cavity and a latch mounted proximate to the external opening of the cavity 210 (not shown). When the cavity 210 receives the stylus 300 therein, the stylus 300 further presses on the spring in the cavity 210 (not shown) while the latch engages in a slot 312 on a portion of the stylus 300 that protrudes over the cavity 210. The latch is directed to immobilize and hold the stylus 300 against the resilient force that is exerted by the spring on the stylus 300 when the stylus 300 is arranged in the cavity 210. When the stylus 300 is to be extracted, the user disengages the latch and, under the resilient force of the spring, the stylus 300 is ejected out of the cavity 210.

The above mechanism may render the extraction of the stylus easier, but it necessitates an important amount of elements, and from user-convenience consideration, its operation still may not be satisfactory.

SUMMARY OF INVENTION

An aspect of the present invention is therefore to provide a stylus retaining and releasing mechanism for stylus-receiving housing that can facilitate an extraction of the stylus once it is arranged in the housing.

To accomplish the above and other objectives, the stylus retaining and releasing mechanism of the invention is installed in a housing that includes a cavity therein to receive a stylus. The stylus retaining and releasing mechanism comprises a retainer, a releasing device, and an impeding member. The retainer is placed adjacent to the cavity and includes a clamping member that protrudes from the retainer. The retainer can resiliently deviate to press on the stylus when the stylus, slidably inserted in the cavity, contacts with the clamping member. The releasing device is fixedly attached on the housing at a location that terminates the cavity so that the inserted stylus presses on the releasing device to accumulate resilient force therein. As the inserted stylus slides in the cavity and presses on the releasing device, resilient force accumulates in the releasing device until a stable configuration thereof is attained, at the time of which the clamping member inserts in a retaining slot on the stylus to hold and immobilize the stylus. Once the insertion of the stylus in the housing is hence completed, a portion of the stylus slightly protrudes externally over the cavity of the housing. To extract the stylus from the housing, the user effectuates a short pressing action on the stylus, which overcomes the hold of the retainer and presses the stylus on the releasing device. The stylus thereby disengages the releasing device from its stable configuration of storing resilient force. As a result, the releasing device exerts a resilient force on the stylus that can overcome the hold of the retainer and reversely ejects the stylus partially out of the cavity. With the stylus hence substantially protruding over the housing, a take-up of the stylus is facilitated.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
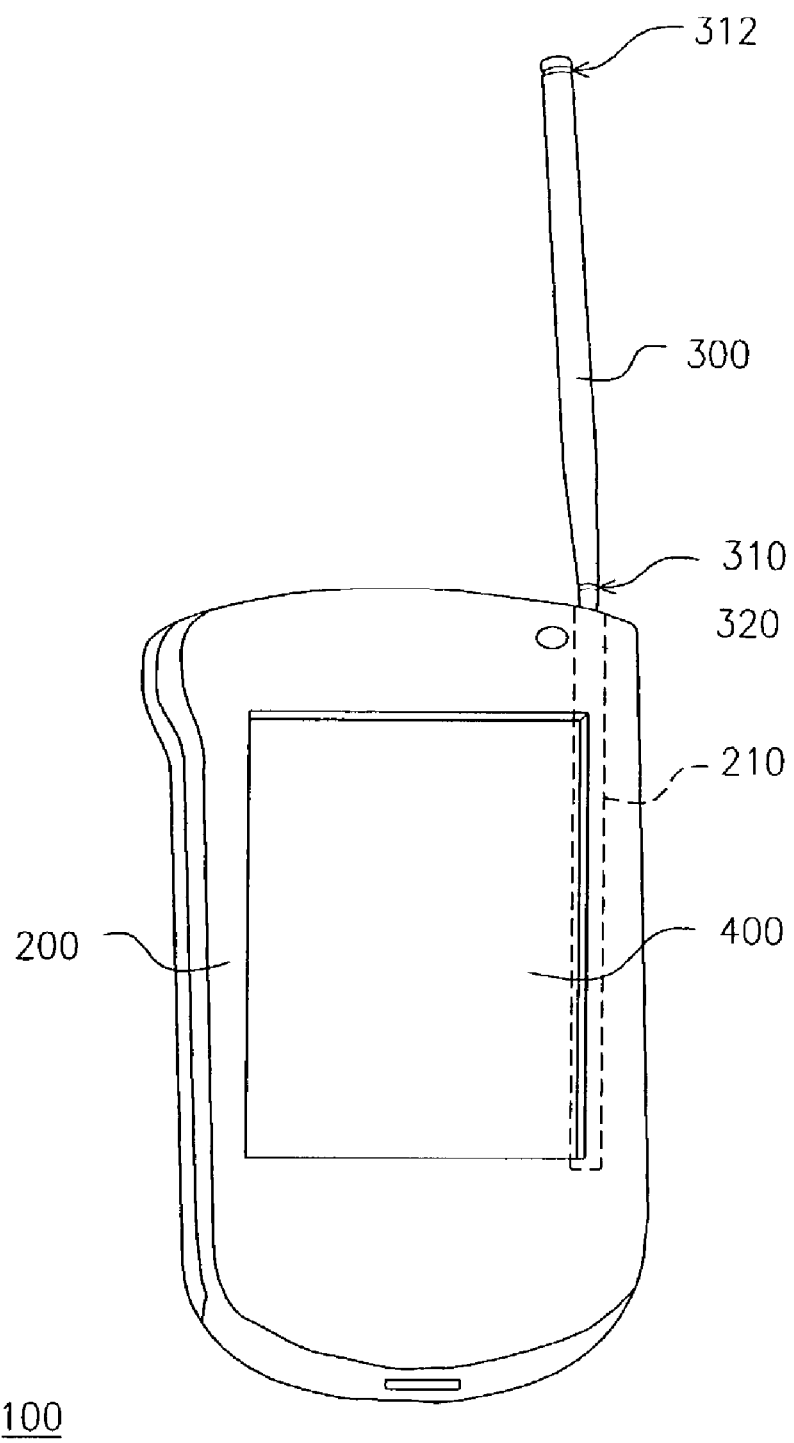
FIG. 1 is a perspective view that schematically illustrates a conventional electronic device provided with a stylus as pointing device.

The following detailed description of the embodiments and examples of the present invention with reference to the accompanying drawings is only illustrative and not limiting. Wherever possible in the following description and accompanying drawings, like reference numerals and symbols will refer to like elements and parts unless otherwise described.

Figure 2:
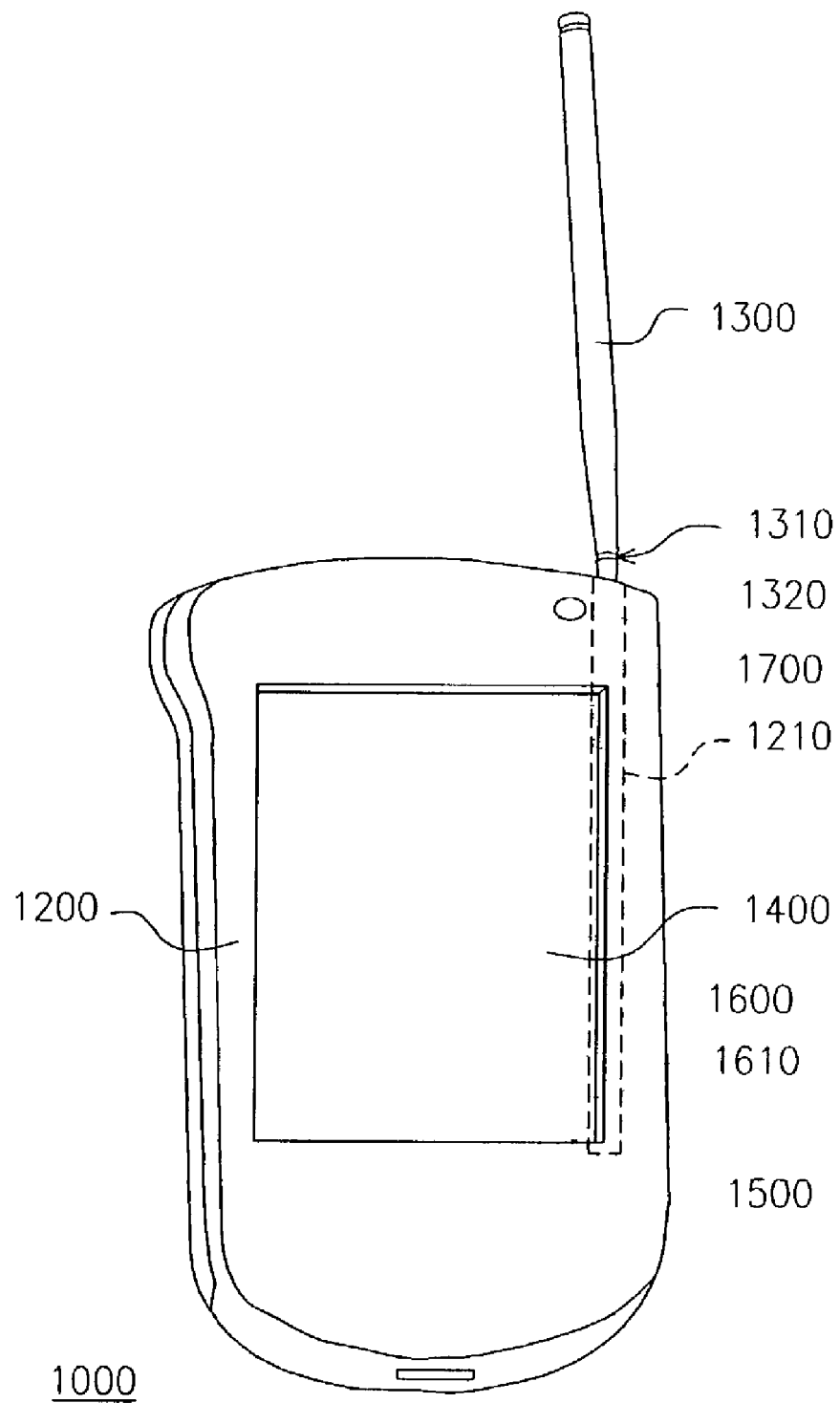
FIG. 2 is a perspective general view of an electronic device having a housing which is provided with a stylus retaining and releasing mechanism according to an embodiment of the invention.
Figure 3:
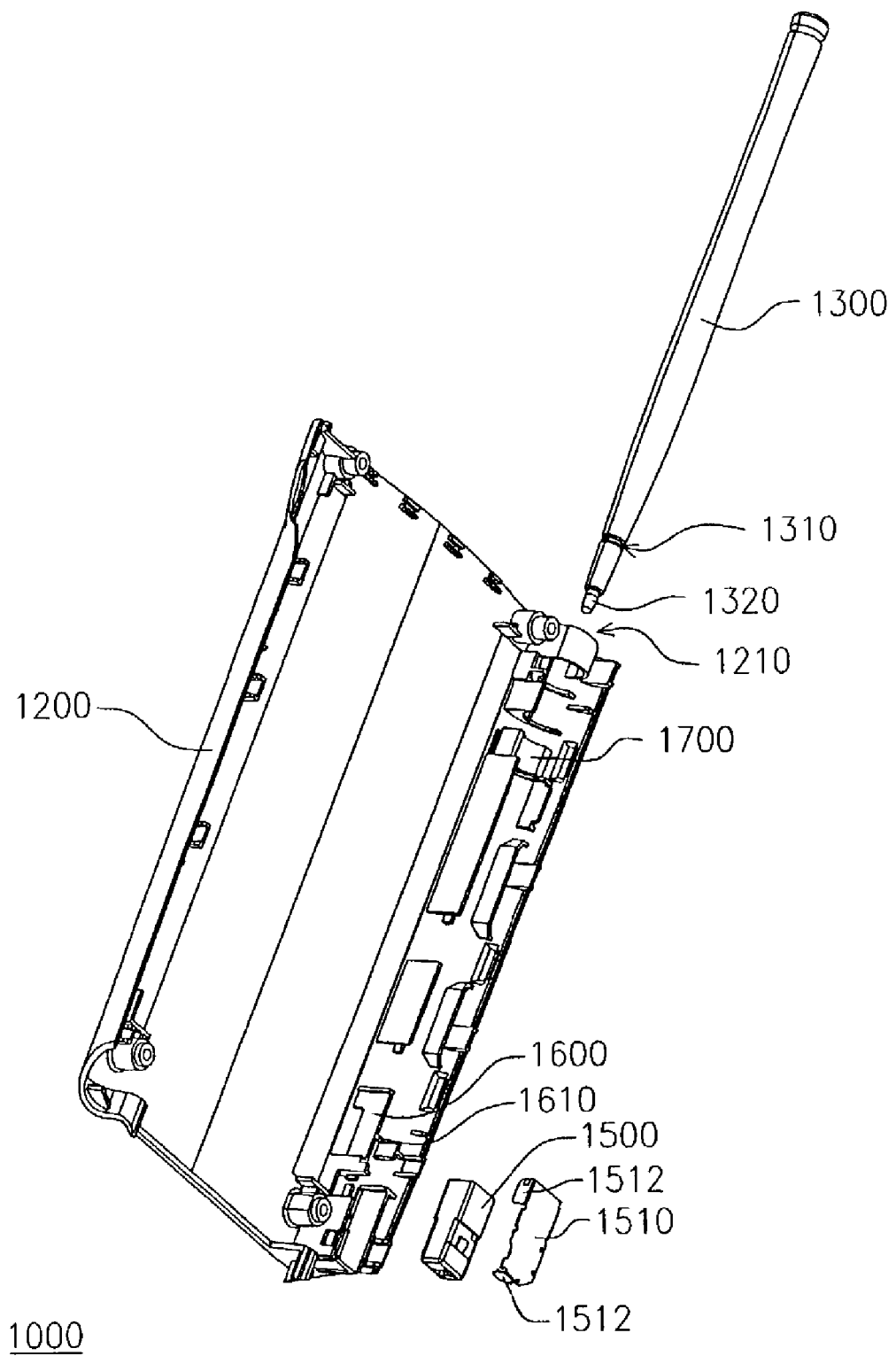
FIG. 3 is a perspective and partially exploded view of an interior of the housing of FIG. 2 provided with a stylus retaining and releasing mechanism according to an embodiment of the invention.
Figure 4:
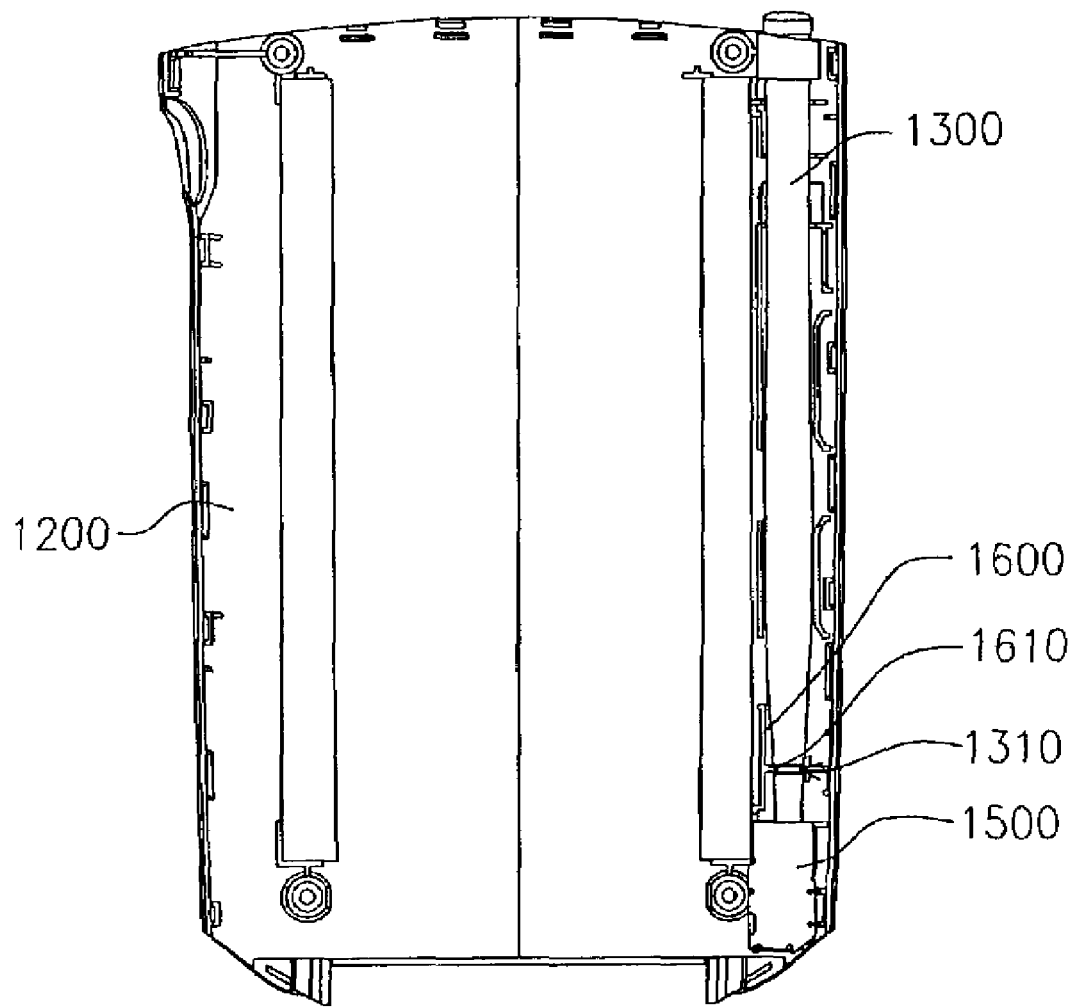
FIG. 4 is an upward view of an interior of the housing provided with a stylus retaining and releasing mechanism according to an embodiment of the invention.

Referring now to FIG. 2 through FIG. 4, various views schematically illustrate a stylus retaining and releasing mechanism for stylus-receiving housing according to an embodiment of the invention.

FIG. 2 is a general perspective view that illustrates an example of equipment in which the invention may be implemented. As illustrated in FIG. 2, the stylus retaining and releasing mechanism of the invention may be typically arranged within a portable or hand-held electronic device 1000 having a touch panel display screen 1400 and a housing 1200, and equipped with a stylus 1300. The electronic device 1000 may be, for example, a Personal Data Assistant (PDA). The stylus 1300 serves as pointing device of the touch panel display screen 1400. The housing 1200 is designed in such a manner that the stylus 1300 can be received therein when it is not used.

Referring to FIG. 3 and FIG. 4, a partially exploded view and an upward view of an interior of the housing 1200 schematically illustrate a stylus retaining and releasing mechanism according to an embodiment of the invention. As illustrated in FIG. 3, a cavity 1210 is arranged within the housing 1200 to receive the stylus 1300 therein. The cavity 1210 is arranged in such a manner that the stylus 1300 can be slidably guided and inserted therein.

To retain or release the stylus 1300 in the cavity 1210, a stylus retaining and releasing mechanism of the invention is arranged within the housing 1200. The stylus retaining and releasing mechanism comprises a releasing device 1500 and a retainer 1600.

The retainer 1600 is arranged adjacent to the cavity 1210 so that when the stylus 1300 is inserted along the cavity 1210, the stylus 1300 can laterally contact with the retainer 1600. The retainer 1600 principally includes a plate that can resiliently deviate, and a clamping member 1610 that protrudes from the plate. The retainer 1600 may be installed via various methods; a simple method includes, for example, forming the retainer 1600 with the housing 1200 in one single body.

The releasing device 1500 terminates the cavity 1210 so that an end 1320 of the stylus 1300 abuts against the releasing device 1500 when the insertion of the stylus 1300 in the housing 1200 is complete. The releasing device 1500 can be fixedly attached onto the housing 1200 via, for example, a resilient metallic plate 1510 that terminates into bent claws 1512 with sharp edges capable of fixedly inserting into the housing 1200. The claws 1512 may be bent, for example, perpendicularly to the resilient metallic plate 1510 to fixedly insert into the housing 1200.

Furthermore, the releasing device 1500 should be designed so as to operate in a two-state fashion. In a first state, the releasing device 1500 is in a stable configuration while storing resilient force; the first state is attained via a first short pressing action exerted on the releasing device 1500. In a second state, the releasing device 1500 is in a resting configuration without resilient force stored therein. To pass from the first state to the second state, a second short pressing action should be typically exerted on the releasing device 1500 that, thereby, disengages from its first state and releases resilient force to attain its second state. The first and second states typically correspond to two static positions attainable by a resilient element within the releasing device 1500. To attain each of the two stable positions, the resilient element moves within the releasing device 1500 to either store or release resilient force. A device that operates according to the above manner is known and used in conventional ink automatic pens, wherein it may typically include cam and spring elements.

The following description now focuses on the operation of the stylus retaining and releasing mechanism according to an embodiment of the invention.

To arrange the stylus 1300 within the housing 1200 of the electronic device 1000 (see FIG. 1), the user slidably inserts the stylus 1300 into the cavity 1210. The stylus 1300 slides along the cavity 1210 until the stylus 1300 contacts with the clamping member 1610. The plate that holds the clamping member 1610 thereby resiliently deviates and laterally presses on the stylus 1300 through the clamping member 1610.

The stylus 1300 slides until its end 1320 further presses on the releasing device 1500 to accumulate resilient force therein. Once the stylus 1300 has engaged the releasing device 1500 into the first state of storing resilient force, the clamping member 1610 inserts in a retaining slot 1310 that is arranged on the stylus 1300.

FIG. 4 is an upward view that shows a completed insertion of the stylus 1300 in the cavity 1210. Once the first state of storing resilience energy is attained, the insertion of the stylus 1300 in the housing 1200 is completed and the retainer 1600 alone holds the stylus 1300 in the cavity 1210. The user can sensitively feel that the insertion is completed from, for example, the engagement of the clamping member 1610 in the retaining slot 1310. The stylus 1300 can be thereby held and immobilized within the cavity 1210 of the housing 1200. Meanwhile, the releasing device 1500 is in a stable configuration in which resilient force is stored. In this completed arrangement, an end of the stylus 1300 slightly protrudes out of the cavity 1210.

To extract the stylus 1300 from the housing 1200, the user first exerts a short pressing action on the stylus 1300. The short pressing action overcomes the hold of the retainer 1600, and further presses the stylus 1300 on the releasing device 1500, which disengages the releasing device 1500 from its first state. In order to attain the second state of resting configuration without stored resilient force, the releasing device 1500 exerts a resilient force on the stylus 1300 that is opposite to the direction of the pressing action. The resilient force is such that it releases the stylus 1300 from the hold of the retainer 1600 and ejects the stylus 1300 partially out of the cavity 1210.

To moderate the ejection of the stylus 1300 if an excessive resilient force is exerted from the releasing device 1500, an impeding member 1700 made of a material with high friction coefficient may be arranged so as to contact with the stylus 1300 along its sliding pathway. The impeding member 1700 may be arranged, for example, proximate to the external opening of the cavity 1210 and includes, for example, foam polymer material.

With the above retaining and releasing mechanism of the invention, the stylus 1300 can be therefore extracted from the housing 1200 by short pressing action on the stylus 1300. After short pressing action, the stylus 1300 is ejected in such a manner that it substantially protrudes over the cavity 1210 of the housing 1200 without completely jumping out of the cavity 1210. The user can thereby easily grasp and take up the stylus.

In conclusion, the invention provides a stylus retaining and releasing mechanism that allows to retain and conveniently extract a stylus arranged in the housing of a portable or hand-held electronic device. To hold and immobilize the stylus once it is completely arranged in the cavity of the housing, a retainer is arranged in such a manner that it engages in a retaining slot of the stylus. The extraction of the stylus is facilitated by means of a releasing device that terminates the cavity in the housing. With a short pressing action from the user on the stylus, which presses the stylus against the releasing device, the releasing device reversely exerts a resilient force on the stylus. The stylus is thereby released from the hold of the retainer, and is ejected partially out of the housing to be grasped by the user.

It should be apparent to those skilled in the art that other structures that are obtained from various modifications and variations of the structures of the above-described invention would be possible without departing from the scope and spirit of the invention as illustrated herein. Therefore, the above description of embodiments and examples only illustrates specific ways of making and performing the invention that, consequently, should cover variations and modifications thereof provided they fall within the scope of the invention as defined in the following claims.

What is claimed is:

1. A stylus retaining and releasing mechanism suitable for use within a housing that can receive a stylus having a retaining slot formed thereon, wherein the housing has a cavity into which the stylus can be slidably inserted, the stylus retaining and releasing mechanism comprising:
    a stylus-releasing device, wherein the stylus-releasing device is arranged at a location of the housing that terminates the cavity so that, in a first stage of operation, the stylus-releasing device can store resilient force in a stable configuration after the stylus being inserted in the cavity presses on the stylus-releasing device to engage into the first stable configuration, and in a second stage of operation, the stylus-releasing device can exert a resilient force on the stylus being held immobile in the cavity to eject the stylus out of the cavity after a short pressing action is applied on the inserted stylus to disengage the stylus-releasing device from the stable configuration; and
    a retainer, wherein the retainer is arranged adjacent to the cavity so that the retainer can resiliently deviate when contacted with the stylus being inserted in the cavity, the retainer further includes a protruding clamping member that inserts in the retaining slot of the stylus to hold and immobilize the stylus in the cavity once the inserted stylus engages the stylus-releasing device in the stable configuration; wherein the stylus retaining and releasing mechanism further comprises an impeding member made of a material with relatively high friction coefficient, which is so arranged to be in contact with the stylus in the cavity to moderate the ejection of the stylus.

2. The mechanism of claim 1, wherein the retainer is formed with the housing in a single body.

3. The mechanism of claim 1, wherein the impeding member includes foam polymer material.

4. The mechanism of claim 1, wherein the stylus-releasing device is fixedly attached on the housing by means of a resilient plate, the resilient plate is fixedly attached to the stylus-releasing device and further terminates into a plurality of bent claws that fixedly insert in the housing.

5. The mechanism of claim 1, wherein the stylus-releasing device is fixedly attached on the housing by means of a resilient plate, the resilient plate is fixedly attached to the stylus-releasing device and further terminates into a plurality of bent claws that fixedly insert in the housing.

6. An electronic equipment having a touch panel display screen, comprising:
    a stylus, wherein the stylus serves as pointing device, and has a retaining slot thereon;
    a housing, wherein the housing includes a cavity in which the stylus can be slidably inserted when not used;
    a stylus-releasing device, wherein the stylus-releasing device is arranged at a location of the housing that terminates the cavity so that, in a first stage of operation, the stylus-releasing device can store resilient force in a stable configuration after the stylus being inserted in the cavity presses on the stylus-releasing device to engage into the first stable configuration, and in a second stage of operation, the stylus-releasing device can exert a resilient force on the stylus being held immobile in the cavity to eject the stylus out of the cavity after a short pressing action is applied on the inserted stylus to disengage the stylus-releasing device from the stable configuration; and
    a retainer, wherein the retainer is arranged adjacent to the cavity so that the retainer can resiliently deviate when contacted with the stylus being inserted in the cavity, the retainer further includes a protruding clamping member that inserts in the retaining slot of the stylus to hold and immobilize the stylus in the cavity once the inserted stylus engages the stylus-releasing device in the stable configuration; wherein the stylus retaining and releasing mechanism further comprises an impeding member made of a material with relatively high friction coefficient, which is so arranged to be in contact with the stylus in the cavity to moderate the ejection of the stylus.

7. The electronic equipment of claim 6, wherein the retainer is formed with the housing in a single body.

8. The mechanism of claim 6, wherein to impeding member includes foam polymer material.

* * * * *